(12) United States Patent
Kozuki

(10) Patent No.: US 11,287,791 B2
(45) Date of Patent: Mar. 29, 2022

(54) POWER-SOURCE MONITORING APPARATUS, POWER-SOURCE CONTROLLING SYSTEM, AND POWER-SOURCE MONITORING METHOD

(71) Applicant: DENSO TEN Limited, Kobe (JP)

(72) Inventor: Yasunori Kozuki, Kobe (JP)

(73) Assignee: DENSO TEN Limited, Kobe (JP)

( * ) Notice: Subject to any disclaimer, the term of this patent is extended or adjusted under 35 U.S.C. 154(b) by 399 days.

(21) Appl. No.: 16/508,895

(22) Filed: Jul. 11, 2019

(65) Prior Publication Data

US 2020/0103840 A1  Apr. 2, 2020

(30) Foreign Application Priority Data

Sep. 28, 2018 (JP) .............................. JP2018-184579

(51) Int. Cl.
*G01M 17/00* (2006.01)
*G06F 7/00* (2006.01)
*G06F 19/00* (2018.01)
*G05B 19/048* (2006.01)

(52) U.S. Cl.
CPC .... *G05B 19/048* (2013.01); *G05B 2219/2639* (2013.01)

(58) Field of Classification Search
CPC .. G05B 19/048; G05B 2219/2639; A61J 1/10; A61J 1/1406; A61J 1/1481; A61J 1/1487; A61J 1/16; A61J 1/201; A61J 1/2037; A61J 1/2051; A61J 1/2055; A61J 1/2058; A61J 1/2062; A61J 1/2089; A61J 1/2096; A61M 5/14228; A61M 5/16845; B60L 2260/32; B60L 3/0046; B60L 3/0092; B60L 58/18; F04C 2270/0421; Y02T 10/70

See application file for complete search history.

(56) References Cited

U.S. PATENT DOCUMENTS

| 2010/0006360 A1* | 1/2010 | Kishimoto | B60K 6/34 180/65.285 |
| 2013/0169038 A1* | 7/2013 | King | H02J 7/00308 307/10.1 |
| 2018/0201138 A1* | 7/2018 | Yellambalase | B60L 58/12 |
| 2018/0201154 A1* | 7/2018 | Omura | B60K 8/00 |

FOREIGN PATENT DOCUMENTS

| JP | 2001-093063 A | 4/2001 |
| JP | 2016-094297 A | 5/2016 |
| JP | 6381835 B1 | 8/2018 |
| WO | 2018/225225 A1 | 12/2018 |

\* cited by examiner

*Primary Examiner* — Zhipeng Wang
(74) *Attorney, Agent, or Firm* — Oliff PLC

(57) ABSTRACT

A power-source monitoring apparatus according to an embodiment includes an abnormality detecting unit, a measurement unit, and a recording unit. The abnormality detecting unit detects an abnormality in a power source. The power source supplies electric power to an autonomous driving apparatus of a vehicle. The measurement unit measures an elapsed time interval from a time point at which the abnormality detecting unit detects an abnormality in the power source. The recording unit records therein the elapsed time interval measured by the measurement unit.

6 Claims, 4 Drawing Sheets

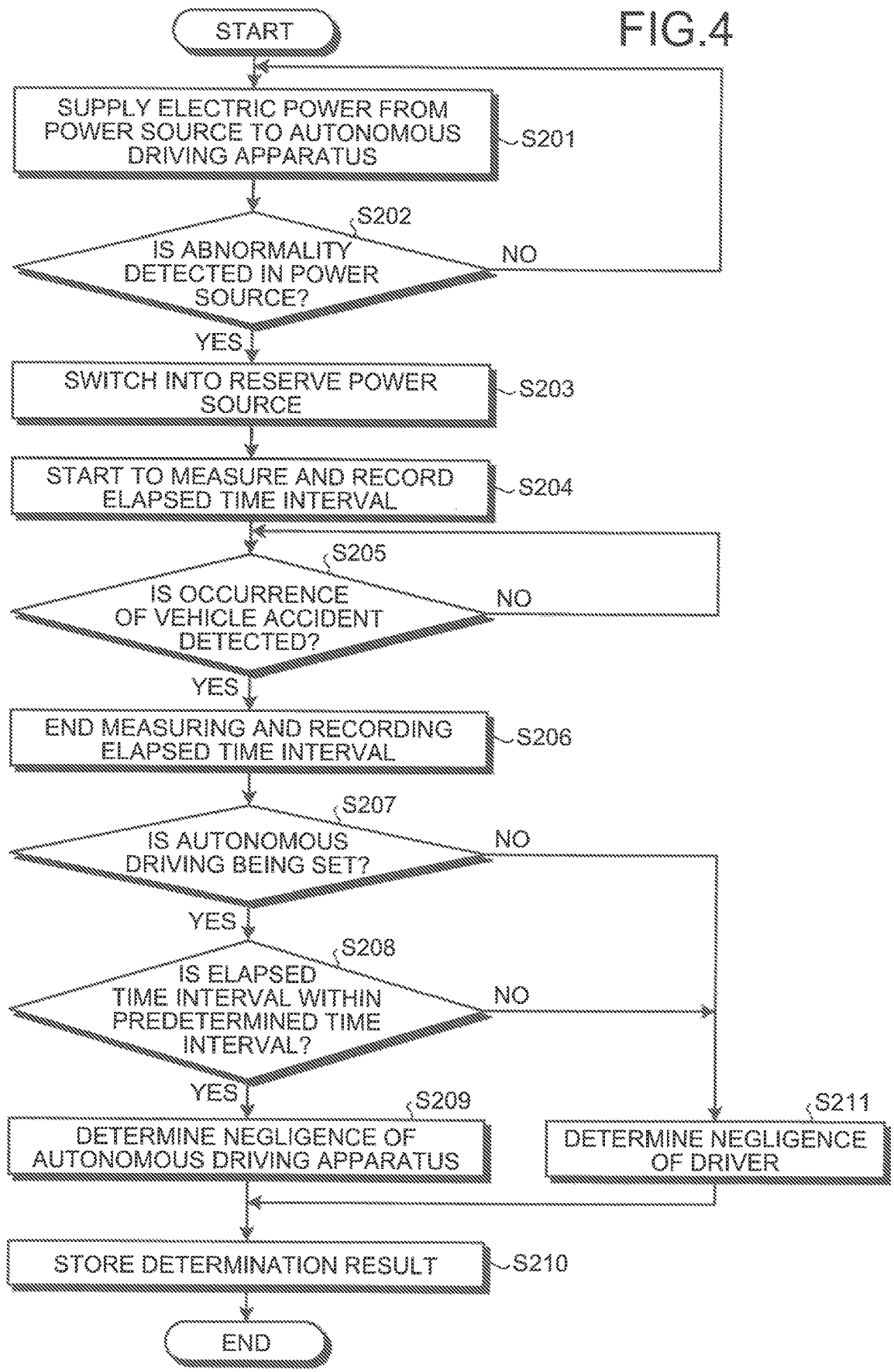

POWER-SOURCE MONITORING APPARATUS, POWER-SOURCE CONTROLLING SYSTEM, AND POWER-SOURCE MONITORING METHOD

CROSS-REFERENCE TO RELATED APPLICATION

This application is based upon and claims the benefit of priority of the prior Japanese Patent Application No. 2018-184579, filed on Sep. 28, 2018, the entire contents of which are incorporated herein by reference.

FIELD

The embodiment discussed herein is directed to a power-source monitoring apparatus, a power-source controlling system, and a power-source monitoring method.

BACKGROUND

Conventionally, there has been known a technology that supplies, when the voltage of a main power source for supplying electric power to a load is reduced, electric power to the load from a reserve power source, so as to extend an operation time interval of the load (see Japanese Laid-open Patent Publication No. 2016-094297, for example).

In a case where this technology is employed for an autonomous driving apparatus of a vehicle, for example, electric power is supplied to the autonomous driving apparatus from the reserve power source when an abnormality occurs in a power source during autonomous driving, so that it is possible to gain a time interval until a driver starts to perform manual driving instead of the autonomous driving apparatus.

However, at present, it is difficult to specify that a cause of a vehicle accident is which of a negligence of the autonomous driving apparatus and a negligence of the driver, when the vehicle accident occurs after an abnormality has occurred in the power source.

SUMMARY

A power-source monitoring apparatus (3) according to an embodiment includes an abnormality detecting unit (51), a measurement unit (52), and a recording unit (42). The abnormality detecting unit (51) detects an abnormality in a power source (11). The power source (11) supplies electric power to an autonomous driving apparatus (13) of a vehicle. The measurement unit (52) measures an elapsed time interval from a time point at which the abnormality detecting unit (51) detects an abnormality in the power source (11). The recording unit (42) records therein the elapsed time interval measured by the measurement unit (52).

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIG. 4 is a flowchart illustrating one example of a process to be executed by a control unit of a power-source monitoring apparatus according to the embodiment.

DESCRIPTION OF EMBODIMENTS

Hereinafter, an embodiment of a power-source monitoring apparatus, a power-source controlling system, and a power-source monitoring method will be described in detail with reference to the accompanying drawings. Moreover, the disclosed technology is not limited to the embodiment described below.

Figure 1:
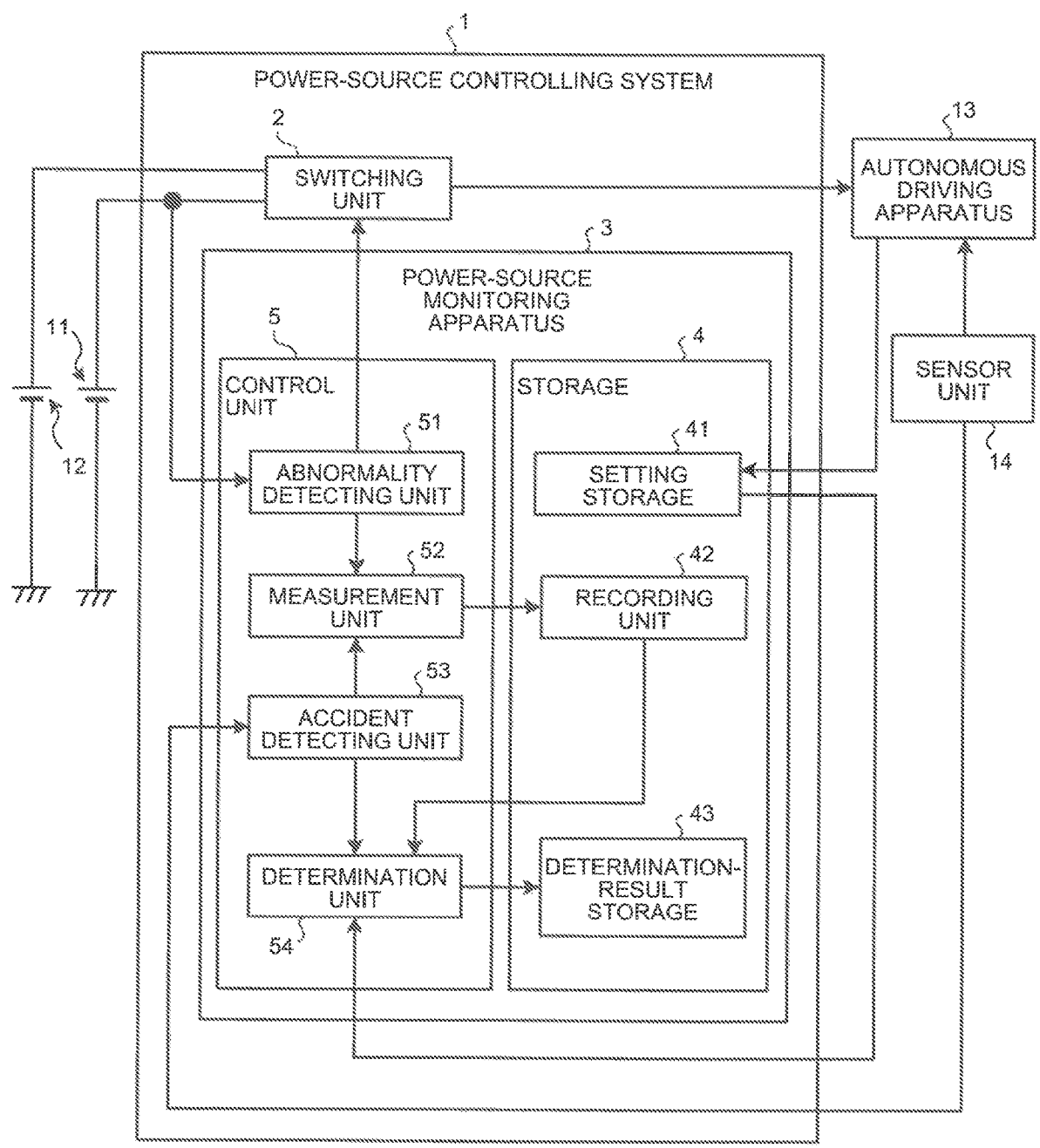
FIG. 1 is a block diagram illustrating a configuration example of a power-source controlling system according to an embodiment.

FIG. 1 is a block diagram illustrating a configuration example of a power-source controlling system 1 according to the embodiment. The power-source controlling system 1 is a system that is connected to a power source 11, a reserve power source 12, an autonomous driving apparatus 13 mounted on a vehicle, and a sensor unit 14, so as to supply electric power to the autonomous driving apparatus 13 from the power source 11 or the reserve power source 12.

The power source 11 includes, for example, a lead storage battery. The reserve power source 12 includes, for example, a lithium-ion battery. The sensor unit 14 includes a plurality of sensors such as an image sensor that captures the vicinity of the vehicle, a radar that detects a target object existing in the periphery of the vehicle, a vehicle-speed sensor, and an acceleration sensor.

The autonomous driving apparatus 13 operates by electric power that is supplied from the power source 11 or the reserve power source 12 via the power-source controlling system 1, and automatically performs, on the basis of a detection result input from the plurality of sensors included in the sensor unit 14, acceleration/deceleration and steering on the vehicle, so as to cause the vehicle to perform autonomous-driving travel.

When the power source 11 is normal, the power-source controlling system 1 supplies, from the power source 11, electric power to the autonomous driving apparatus 13. When an abnormality has occurred in the power source 11, for example, disconnection of a battery, reduction in the voltage and/or short of the power source 11, and the like; the power-source controlling system 1 supplies from the reserve power source 12 electric power to the autonomous driving apparatus 13.

The reserve power source 12 accumulates therein electric power having an amount where the autonomous driving apparatus 13 is able to be normally operated for a predetermined time interval (for example, ten and several seconds to several minutes) after an abnormality has occurred in the power source 11. The above-mentioned predetermined time interval means a time interval sufficient for a driver of an autonomously-driven vehicle to prepare for manual driving when the autonomous driving is to be changed into the manual driving. Furthermore, the predetermined time interval means a time interval during which the autonomous driving apparatus 13 is able to normally execute autonomous driving by using electric power of the reserve power source 12 even when an abnormality occurs in the power source 11.

Thus, the autonomous driving apparatus 13 is capable of normally executing autonomous driving during the predetermined time interval even when an abnormality occurs in the power source 11. Note that the autonomous driving apparatus 13 is not able to execute the autonomous driving after the predetermined time interval has elapsed from an occurrence of an abnormality in the power source 11.

The power-source controlling system 1 includes a switching unit 2 and a power-source monitoring apparatus 3. The switching unit 2 normally supplies electric power, which is input from the power source 11, to the autonomous driving apparatus 13, and when a switching instruction is input from the power-source monitoring apparatus 3, switches the electric power, which is to be supplied to the autonomous driving apparatus 13, therefrom into electric power that is input from the reserve power source 12.

When switching the electric power, which is to be supplied to the autonomous driving apparatus 13, into electric power that is input from the reserve power source 12, the switching unit 2 outputs switching information indicating the fact to the autonomous driving apparatus 13. When the switching information is input from the switching unit 2, the autonomous driving apparatus 13 requests a vehicle driver to start manual driving.

The power-source monitoring apparatus 3 monitors the voltage of the power source 11, for example, when the voltage of the power source 11 is equal to or less than a predetermined threshold, outputs a switching instruction to the switching unit 2. Thus, even when an abnormality occurs in the power source 11, autonomous driving, which is executed by the autonomous driving apparatus 13, is continued by using electric power that is supplied from the reserve power source 12 during the predetermined time interval, so that the power-source monitoring apparatus 3 is capable of gaining a time interval until a driver starts to perform manual driving instead of the autonomous driving apparatus 13.

The power-source monitoring apparatus 3 includes a storage 4 and a control unit 5. The storage 4 is an information storing device, such as a data flash, and includes a setting storage 41, a recording unit 42, and a determination-result storage 43.

The setting storage 41 stores therein setting information indicating a state where autonomous driving is being set or a state where setting of the autonomous driving is being released. For example, when a driver performs a setting operation of autonomous driving and information indicating the fact is input from the autonomous driving apparatus 13, the setting storage 41 stores therein setting information indicating a state where autonomous driving is being set.

When a driver performs an operation for releasing setting of autonomous driving and information indicating the fact is input from the autonomous driving apparatus 13, the setting storage 41 stores therein setting information indicating a state where setting of the autonomous driving is being released. The recording unit 42 records therein an elapsed time interval that is measured by a measurement unit 52 to be mentioned later. The determination-result storage 43 stores therein a result of determination executed by a determination unit 54 to be mentioned later.

The control unit 5 includes a microcomputer, which includes a Central Processing Unit (CPU), a Read Only Memory (ROM), a Random Access Memory (RAM), and the like; and various circuits.

The control unit 5 includes an abnormality detecting unit 51, the measurement unit 52, an accident detecting unit 53, and the determination unit 54, where the CPU executes a program stored in the ROM by using the RAM as a work region so that the abnormality detecting unit 51, the measurement unit 52, the accident detecting unit 53, and the determination unit 54 function.

A part or all of the abnormality detecting unit 51, the measurement unit 52, the accident detecting unit 53, and the determination unit 54, which are included in the control unit 5, may be constituted of hardware such as an Application Specific Integrated Circuit (ASIC) and a Field Programmable Gate Array (FPGA).

Each of the abnormality detecting unit 51, the measurement unit 52, the accident detecting unit 53, and the determination unit 54, which are included in the control unit 5, executes a corresponding process described below. An inner configuration of the control unit 5 is not limited to the configuration illustrated in FIG. 1, and may have another configuration as long as the configuration is for executing information processing to be mentioned later.

When the voltage of the power source 11 is monitored and the voltage of the power source 11 is equal to or less than a predetermined threshold, the abnormality detecting unit 51 detects an abnormality in the power source 11. When detecting the abnormality in the power source 11, the abnormality detecting unit 51 outputs information indicating the fact to the measurement unit 52, and further outputs a switching instruction to the switching unit 2.

The measurement unit 52 is a timer that measures an elapsed time interval from a time point at which the abnormality detecting unit 51 detects an abnormality in the power source 11, in other words, an elapsed time interval from a time point at which electric power starts to be supplied from the reserve power source 12 to the autonomous driving apparatus 13. The measurement unit 52 sequentially updates the measured time interval and outputs the updated measured time interval to the recording unit 42 so as to cause the recording unit 42 to record therein the updated measured time interval.

Thus, for example, in a case where a vehicle accident occurs after an occurrence of an abnormality in the power source 11, when the recorded elapsed time interval is read out from the recording unit 42, it is possible to specify that a cause of the vehicle accident is which of a negligence of the autonomous driving apparatus 13 and a negligence of a driver.

Specifically, when the elapsed time interval that is read out from the recording unit 42 is within a predetermined time interval (time interval capable of ensuring normal operation of autonomous driving apparatus 13 using reserve power source 12), a vehicle accident has occurred during autonomous driving, so that it is possible to specify that a cause is a negligence of the autonomous driving apparatus 13.

When the elapsed time interval read out from the recording unit 42 is not within the predetermined time interval, namely, when the elapsed time interval exceeds the predetermined time interval, a vehicle accident has occurred during manual driving, so that it is possible to specify that a cause is a negligence of a driver.

In a case of a vehicle accident whose scale of damage is comparatively large, the measurement unit 52 stops measuring an elapsed time interval due to breakage, on the other hand, in a case of a vehicle accident whose scale of damage is comparatively small, there presents possibility of continuing to measure the elapsed time interval even after the accident. Thus, the control unit 5 is configured to include the accident detecting unit 53.

The accident detecting unit 53 detects an occurrence of a vehicle accident on the basis of a detection result of an acceleration sensor included in the sensor unit 14. For example, when the acceleration sensor detects an acceleration exceeding a predetermined threshold, the accident detecting unit 53 detects an occurrence of a vehicle accident.

When detecting an occurrence of a vehicle accident, the accident detecting unit 53 outputs information indicating the fact to the measurement unit 52 and the determination unit 54. When the information indicating that an occurrence of a vehicle accident is detected is input from the accident detecting unit 53, the measurement unit 52 ends the measurement of the elapsed time interval. Thus, the recording unit 42 is capable of recording a precise elapsed time interval from a time point when an abnormality is detected in the power source 11 to a time point when a vehicle accident has occurred.

When the information indicating that an occurrence of a vehicle accident is detected is input from the accident detecting unit 53, the determination unit 54 determines whether or not the elapsed time interval recorded in the recording unit 42 is within a predetermined time interval, and stores a determination result in the determination-result storage 43.

Thus, when a vehicle accident occurs after an occurrence of an abnormality in the power source 11, with reference to a determination result whether or not an elapsed time interval stored in the determination-result storage 43 is within a predetermined time interval, it is possible to easily specify that a cause of the vehicle accident is which of a negligence of the autonomous driving apparatus 13 and a negligence of a driver.

Moreover, when an elapsed time interval recorded in the recording unit 42 is within the predetermined time interval, the determination unit 54 may determine that a cause of the vehicle accident is a negligence of the autonomous driving apparatus, and when the elapsed time interval recorded in the recording unit 42 is not within the predetermined time interval, the determination unit 54 may determine that a cause of the vehicle accident is a negligence of a driver.

When determining a cause of a vehicle accident in this manner, the determination unit 54 stores a determination result of an accident cause in the determination-result storage 43. Thus, when a vehicle accident occurs after an occurrence of an abnormality in the power source 11, with reference to only the determination result of the accident cause stored in the determination-result storage 43, it is possible to immediately specify that a cause of the vehicle accident is which of a negligence of the autonomous driving apparatus 13 and a negligence of a driver.

Moreover, the determination unit 54 may determine, on the basis of setting information stored in the setting storage 41, whether a cause of a vehicle accident is a negligence of the autonomous driving apparatus or a negligence of a driver. For example, even in a state where the elapsed time interval recorded in the recording unit 42 is within a predetermined time interval, when setting information indicating a state where setting of the autonomous driving is being released is stored in the setting storage 41, the determination unit 54 determines a cause of a vehicle accident to be a negligence of a driver.

Thus, when a vehicle accident occurs before the predetermined time interval has elapsed from a time when an abnormality occurred in the power source 11, it is possible to prevent the determination unit 54 from erroneously determining, even during manual driving, that a cause of the vehicle accident is a negligence of the autonomous driving apparatus.

Figure 2:
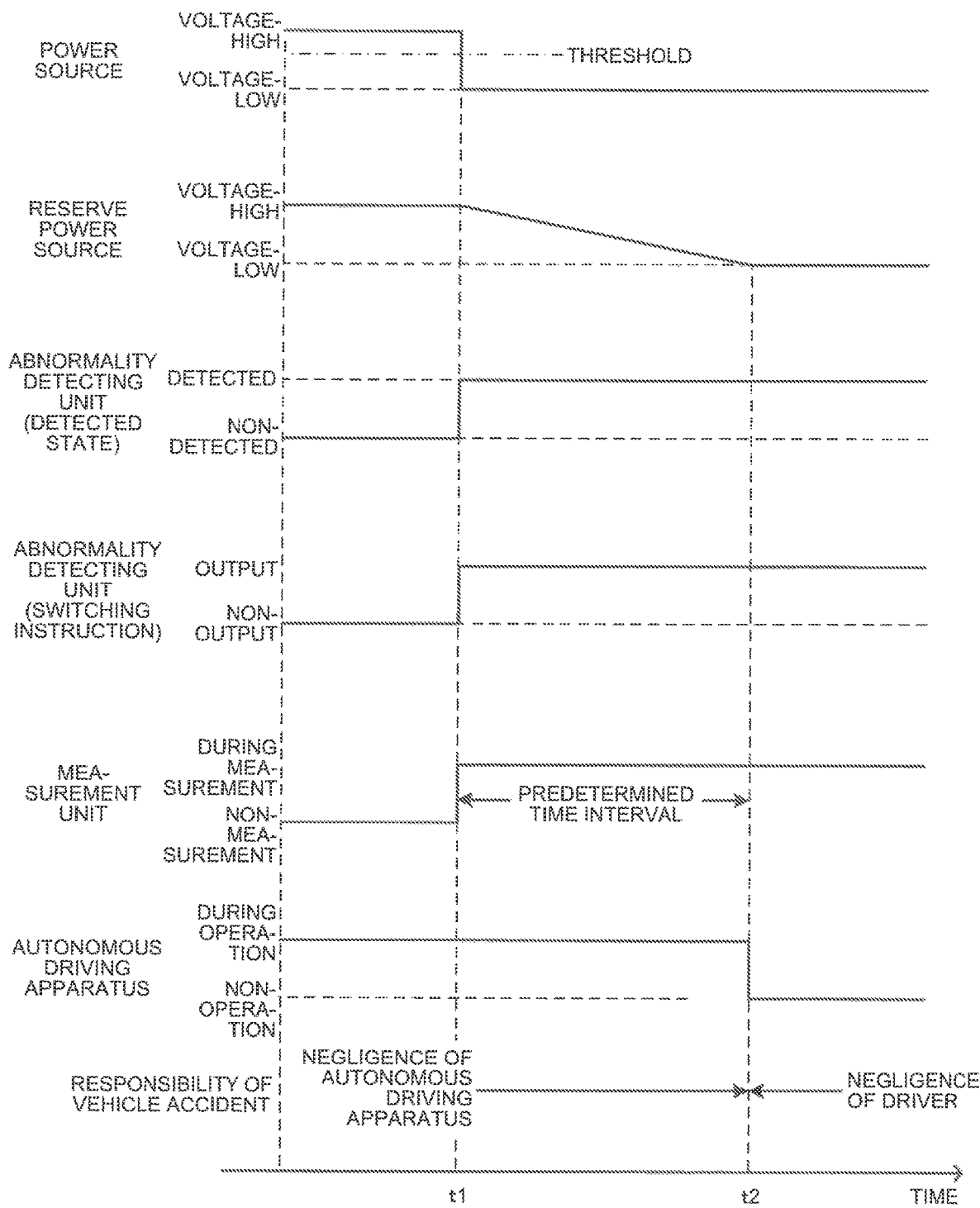
FIG. 2 is a timing diagram illustrating operations of the power-source controlling system according to the embodiment.

Next, with reference to FIG. 2, one example of operations of the power-source controlling system 1 according to the embodiment will be explained. FIG. 2 is a timing diagram illustrating operations of the power-source controlling system 1 according to the embodiment. Herein, a case will be explained in which an abnormality occurs in the power source 11 at a time point t1 while the autonomous driving apparatus is operating (during autonomous driving).

In FIG. 2, there are illustrated from the top, a state of the power source 11, a state of the reserve power source, an abnormality detection state of the power source 11 by the abnormality detecting unit 51, an outputting state of a switching instruction by the abnormality detecting unit 51, a measurement state of an elapsed time interval by the measurement unit 52, an operation state of the autonomous driving apparatus 13, and the responsibility of a vehicle accident.

As illustrated in FIG. 2, in the power-source controlling system 1, when the voltage of the power source 11 is equal to or less than a threshold at the time point t1, the abnormality detecting unit 51 detects an abnormality in the power source 11. The abnormality detecting unit 51 outputs a switching instruction to the switching unit 2 at the time point t1. Thus, the autonomous driving apparatus 13 is capable of continuing autonomous driving by using electric power supplied from the reserve power source 12 during a predetermined time interval after the time point t1.

The abnormality detecting unit 51 outputs, to the measurement unit 52, information indicating detection of an abnormality in the power source 11 at the time point t1. The measurement unit 52 starts to measure an elapsed time interval from the time point t1. Next, during a time interval from an occurrence of an abnormality in the power source 11 to a time point t2 that is after a predetermined time interval of the occurrence of the abnormality, the voltage of the reserve power source 12 is gradually reduced to fall below an operable voltage of the autonomous driving apparatus 13 at the time point t2.

Thus, the autonomous driving apparatus 13 has been changed into a non-operation state since the time point t2. As described above, in the case illustrated in FIG. 2, during a time interval before the time point t2, the autonomous driving apparatus 13 operates to cause a vehicle to travel by using autonomous driving.

As described above, when an abnormality occurs in the power source 11 and switching information is input from the switching unit 2, the autonomous driving apparatus 13 requests a driver to start manual driving. Thus, a driver is supposed to prepare for manual driving during a time interval from the occurrence of the abnormality in the power source 11 until a predetermined time interval has therefrom elapsed, and is further supposed to start manual driving from at least the time point t2.

Thus, in the case illustrated in FIG. 2, when a vehicle accident occurs before the time point t2, the determination unit 54 determines that a cause of the vehicle accident is a negligence of the autonomous driving apparatus 13. When a vehicle accident occurs after the time point t2, the determination unit 54 determines that a cause of the vehicle accident is a negligence of a driver.

Figure 3:
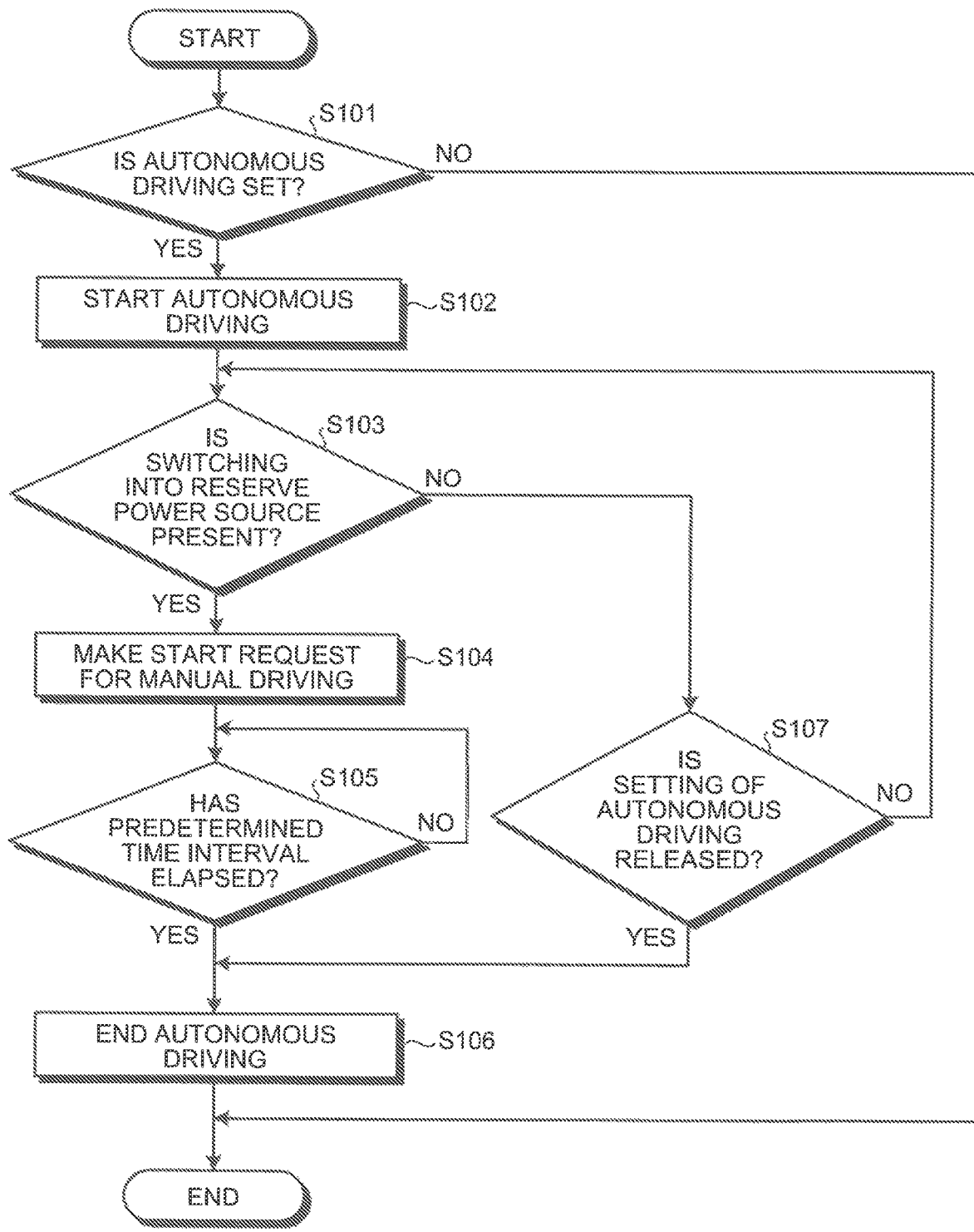
FIG. 3 is a flowchart illustrating one example of a process to be executed by an autonomous driving apparatus according to the embodiment.

Next, with reference to FIG. 3, a process to be executed by the autonomous driving apparatus 13 according to the embodiment will be explained. FIG. 3 is a flowchart illustrating one example of the process to be executed by the autonomous driving apparatus 13 according to the embodiment. When an ignition switch (hereinafter, may be referred to as "IG") of a vehicle is turned ON, the autonomous driving apparatus 13 repeatedly execute the process illustrated in FIG. 3 at a predetermined period.

When the IG is turned ON, the autonomous driving apparatus 13 determines whether or not autonomous driving is set (Step S101). When the autonomous driving apparatus 13 determines that autonomous driving is not set (Step S101: No), end the processing, and the processing is restarted from Step S101.

When determining that autonomous driving is set (Step S101: Yes), the autonomous driving apparatus 13 starts autonomous driving (Step S102), and determines whether or not there presents switching from the power source 11 into the reserve power source 12 (Step S103).

When determining that there presents no switching into the reserve power source 12 (Step S103: No), the autonomous driving apparatus 13 determines whether or not the setting of the autonomous driving is released (Step S107). When determining that the setting of autonomous driving is not released (Step S107: No), the autonomous driving apparatus 13 shifts the processing to Step S103.

When determining that the setting of autonomous driving is released (Step S107: Yes), the autonomous driving apparatus 13 ends the autonomous driving (Step S106), and ends the processing. Next, the autonomous driving apparatus 13 restarts the processing from Step S101.

When determining that there presents switching into the reserve power source 12 (Step S103: Yes), the autonomous driving apparatus 13 makes a start request for manual driving to a driver (Step S104). Next, the autonomous driving apparatus 13 determines whether or not a predetermined time interval has elapsed (Step S105). When determining that the predetermined time interval has not elapsed yet (Step S105: No), the autonomous driving apparatus 13 repeats the determination process of Step S105 until the predetermined time interval has elapsed.

When determining that the predetermined time interval has elapsed (Step S105: Yes), the autonomous driving apparatus 13 ends the autonomous driving (Step S106), and ends the processing. When the IG is turned OFF during execution the process illustrated in FIG. 3, the autonomous driving apparatus 13 ends the processing at this time point.

Next, with reference to FIG. 4, one example of a process to be executed by the control unit 5 of the power-source monitoring apparatus 3 according to the embodiment will be explained. FIG. 4 is a flowchart illustrating one example of the process to be executed by the control unit 5 of the power-source monitoring apparatus 3 according to the embodiment.

When the IG of the vehicle is turned ON, the control unit 5 starts a process illustrated in FIG. 4. When the IG is turned OFF during execution of the process illustrated in FIG. 4, the control unit 5 ends the processing at this time point.

When the IG is turned ON, the control unit 5 supplies electric power from the power source 11 to the autonomous driving apparatus 13 (Step S201). Subsequently, the control unit 5 determines whether or not an abnormality in the power source 11 is detected (Step S202).

When determining that an abnormality is not detected in the power source 11 (Step S201: No), the control unit 5 shifts the processing to Step S201. When determining that an abnormality is detected in the power source 11 (Step S202: Yes), the control unit 5 switches the power source into the reserve power source 12 (Step S203), and starts to measure and record the elapsed time interval (Step S204).

Next, the control unit 5 determines whether or not an occurrence of a vehicle accident is detected (Step S205). When determining that an occurrence of a vehicle accident is not detected (Step S205: No), the control unit 5 repeats the determination process of Step S205 until an occurrence of a vehicle accident is detected.

When determining that an occurrence of a vehicle is detected (Step S205: Yes), the control unit 5 ends measuring and recording the elapsed time interval (Step S206). Subsequently, the control unit 5 determines whether or not autonomous driving is being set (Step S207).

When determining that autonomous driving is not being set (Step S207: No), the control unit 5 shifts the processing to Step S211. When determining that autonomous driving is being set (Step S207: Yes), the control unit 5 determines whether or not an elapsed time interval from the switching into the reserve power source 12 is within a predetermined time interval (Step S208).

When determining that the elapsed time interval is not within the predetermined time interval (Step S208), the control unit 5 determines that a cause of the vehicle accident is a negligence of a driver (Step S211), and shifts the processing to Step S210.

When determining that the elapsed time interval is within the predetermined time interval (Step S208: Yes), the control unit 5 determines that a cause of the vehicle accident is a negligence of the autonomous driving apparatus (Step S209), and shifts the processing to Step S210. In Step S210, the control unit 5 stores the determination result of Step S209 or Step S211, and ends the processing.

The above-mentioned embodiment is merely one example and may be variously modified. For example, the power-source monitoring apparatus 3 may cause a display provided in a vehicle to display a determination result of the determination unit 54. Thus, when a vehicle accident has occurred after an occurrence of an abnormality in the power source 11, it is possible to more easily specify that the responsibility of a vehicle accident is which of a negligence of an autonomous driving apparatus and a negligence of a driver.

The power-source monitoring apparatus 3 may have a configuration in which the measurement unit 52 includes a plurality of timers. In a case of this configuration, for example, the determination unit 54 may determine whether or not an average value of measured time intervals of the timers is within a predetermined time interval, so as to determine whether the responsibility of a vehicle accident is a negligence of the autonomous driving apparatus 13 or a negligence of a driver.

The determination unit 54 may determine, for each of the measured time intervals measured by the timers, whether or not the corresponding measured time interval is within a predetermined time interval, and input the determination results to the AND logic circuit, so as to determine, by using the AND logic circuit, whether the responsibility of the vehicle accident is a negligence of the autonomous driving apparatus 13 or a negligence of the driver. Thus, it is possible to improve the reliability of the determination result determined by the determination unit 54.

When the IG of the vehicle is turned OFF under the state where a vehicle accident has not occurred after the measuring of the elapsed time interval was started, the measurement unit 52 resets the elapsed time interval recorded in the recording unit 42. Thus, the measurement unit 52 is capable of starting measurement of the elapsed time interval from zero when an abnormality occurs in the power source 11 during the next travel.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power-source monitoring apparatus comprising:
a processor configured to:
   detect an abnormality in a power source, the power source supplying electric power to an autonomous driving apparatus of a vehicle;
   output a switching instruction (i) to cause the autonomous driving apparatus to be supplied with electric power from a reserve electric power source and (ii) to request a driver to start manual driving when the abnormality in the power source is detected;
   detect an occurrence of a vehicle accident;
   measure an elapsed time interval from a time point at which the abnormality in the power source is detected until the occurrence of the vehicle accident is detected;
   record in a storage the measured elapsed time interval;
   when the recorded elapsed time interval is within a predetermined time interval, determine that a cause of the vehicle accident is a negligence of the autonomous driving apparatus; and
   when the recorded elapsed time interval is not within the predetermined time interval, determine that the cause of the vehicle accident is a negligence of the driver.

2. The power-source monitoring apparatus according to claim 1, wherein
   the predetermined time interval is a time interval during which the reserve power source is able to ensure a normal operation of the autonomous driving apparatus, the reserve power source supplying, instead of the power source, electric power to the autonomous driving apparatus when the abnormality in the power source is detected.

3. The power-source monitoring apparatus according to claim 1, further comprising:
   a determination-result storage that stores therein a determination result.

4. The power-source monitoring apparatus according to claim 1, further comprising:
   a setting storage that stores therein setting information that indicates which of autonomous driving and manual driving is being set for the vehicle.

5. A power-source controlling system comprising:
a processor configured to:
   detect an abnormality in a power source, the power source supplying electric power to an autonomous driving apparatus of a vehicle;
   cause, when the abnormality in the power source is detected, a reserve power source instead of the power source to supply electric power to the autonomous driving apparatus;
   output an instruction to request a driver to start manual driving when the abnormality in the power source is detected;
   detect an occurrence of a vehicle accident;
   measure an elapsed time interval from a time point at which the abnormality in the power source is detected until the occurrence of the vehicle accident is detected;
   record in a storage the measured elapsed time interval;
   when the recorded elapsed time interval is within a predetermined time interval, determine that a cause of the vehicle accident is a negligence of the autonomous driving apparatus; and
   when the recorded elapsed time interval is not within the predetermined time interval, determine that the cause of the vehicle accident is a negligence of the driver.

6. A power-source monitoring method comprising:
detecting an abnormality in a power source, the power source supplying electric power to an autonomous driving apparatus of a vehicle;
outputting a switching instruction (i) to cause the autonomous driving apparatus to be supplied with electric power from a reserve electric power source and (ii) to request a driver to start manual driving when the abnormality in the power source is detected;
detecting an occurrence of a vehicle accident;
measuring an elapsed time interval from a time point at which the abnormality in the power source is detected until the occurrence of the vehicle accident is detected;
recording the measured elapsed time interval;
when the recorded elapsed time interval is within a predetermined time interval, determining that a cause of the vehicle accident is a negligence of the autonomous driving apparatus; and
when the recorded elapsed time interval is not within the predetermined time interval, determining that the cause of the vehicle accident is a negligence of the driver.

* * * * *